Aug. 8, 1961     H. F. CROMWELL     2,994,930
WEATHERSTRIP FOR A VEHICLE BODY
Filed May 26, 1958
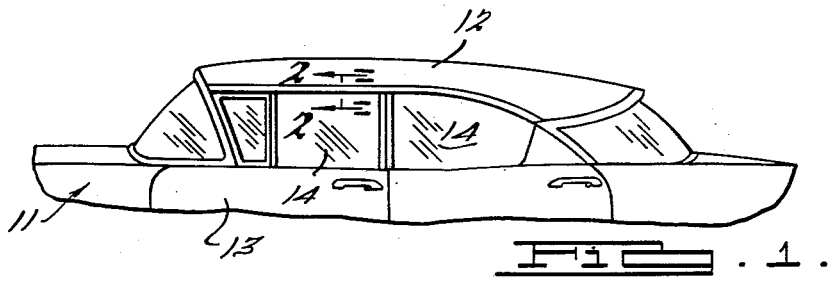
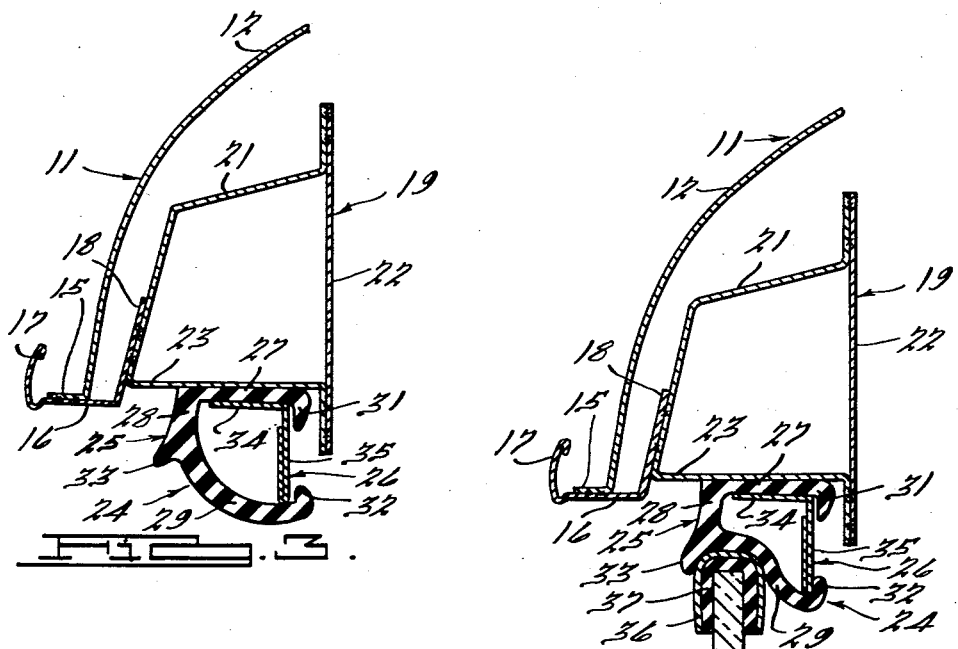
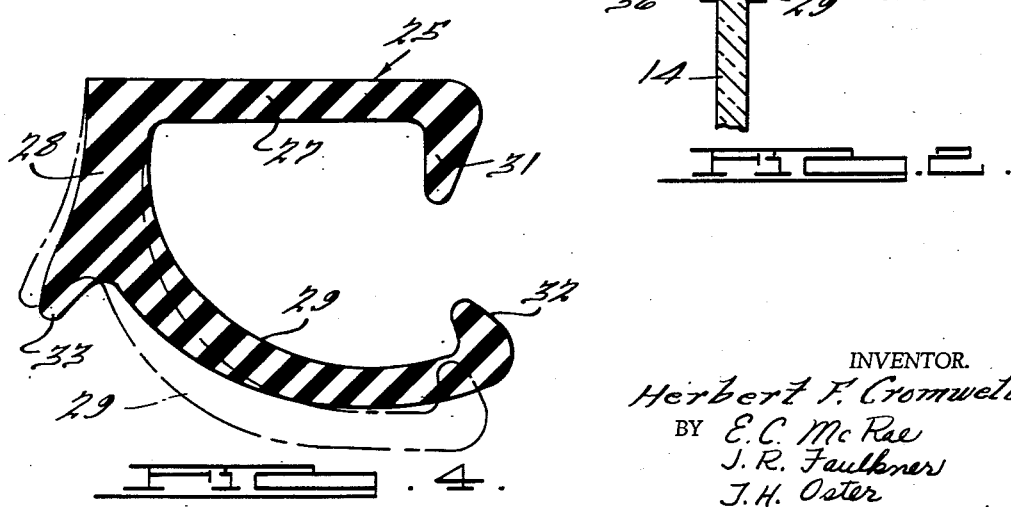
INVENTOR.
Herbert F. Cromwell
BY E. C. McRae
J. R. Faulkner
J. H. Oster
ATTORNEYS.

United States Patent Office 2,994,930
Patented Aug. 8, 1961

2,994,930
WEATHERSTRIP FOR A VEHICLE BODY
Herbert F. Cromwell, Detroit, Mich., assignor to Ford Motor Company, Dearborn, Mich., a corporation of Delaware
Filed May 26, 1958, Ser. No. 737,578
6 Claims. (Cl. 20—69)

This invention relates to a sealing strip or weatherstrip device adapted to close the gap between body frame members defining an opening in a vehicle body and frame members defining a closure structure, such as a door or a luggage compartment lid, movable into and out of said opening.

As is well known, the manufacturing tolerances required to provide reasonable production standards in the manufacture and assembly of vehicle body components are such that it is impossible to provide metal to metal seals of sufficient tightness to prevent air or water leakage there between. In order that the vehicle body be weather tight, it is necessary to provide sealing strips or weatherstrips adapted to close the gap between the metal surfaces of adjacent structural members. Generally, such sealing strips or weatherstrips comprise resilient devices secured to one or the other of the frame members and engaged by the other frame member upon the vehicle body opening being closed by the closure structure. Some of these resilient devices comprise members adapted to be compressed between the opposing frame member surfaces to form the seal. Others comprise members adapted to be deflected, the resistance to deflection causing the member or its deflected portion to press tightly against the frame member causing the deflection so as to prevent the passage of water or air therebetween. And still others are combination compression and deflection devices.

Deflection type seal or weatherstrip devices have an advantage over compression type devices in that they offer less resistance to closing of the closure structure and are less likely to take a permanent set when pressure is applied and maintained against them for long periods of time. As will be readily understood, a compression seal which has taken a permanent set is unable to compensate for the relative movement or play between adjacent frame members resulting from vibratory movements of the vehicle body components as the vehicle is driven about. Deflection seals normally retain their resiliency much longer. However, deflection seals heretofore proposed have been generally less effective than compression seals under extreme adverse conditions. The pressure of the elements, such as rain water or air, particularly under high speed conditions, is frequently sufficient to force the sealing portion away from the frame member thereby permitting undesirable leakage.

It is an object of the present invention to provide an improved seal or weatherstrip device which is basically of the deflection type but which incorporates the sealing effectiveness of compression type devices. To accomplish this, the device embodying the present invention utilizes a relatively non-resilient member positioned to cause increased effectiveness of the sealing pressure of the deflectable portion beyond that which it would ordinarily have without the presence of such a non-resilient member.

In its illustrated embodiment the sealing strip or weatherstrip device embodying the present invention comprises a resilient hollow member, preferably made of rubber, having at least one curved side and being open at another side. The base portion of the resilient member is attached in any convenient manner, preferably by being cemented, to a vehicle body rail section defining an edge of a body opening adapted to receive a closure structure. The open side of the resilient member is bridged by a separate relatively non-resilient member, preferably of metal. The non-resilient member is effective to maintain the longitudinal extremities or edges of the open side of the hollow member in predetermined spaced relationship upon inward flexure of the curved side upon engagement of the same by an edge of the closure structure, thereby to cause the flexed side to be placed under tension to provide a tighter sealing engagement.

Other objects, advantages and features of this invention will be made more apparent as this description proceeds, particularly when considered in connection with the accompanying drawing, wherein:

FIG. 1 is a side elevational view of a portion of a passenger car embodying the present invention;

FIG. 2 is an enlarged sectional view taken substantially on the line 2—2 of FIG. 1 looking in the direction of the arrows;

FIG. 3 is a view in part similar to FIG. 2 illustrating the seal or weatherstrip in unengaged condition;

FIG. 4 is an enlarged sectional view of the resilient member forming a part of the seal or weatherstrip device.

Referring now to the drawing, there is illustrated a portion of a motor vehicle 11 having a roof 12 and doors 13 provided with vertically movable windows 14. In the particular vehicle body model illustrated, the doors 13 do not provide frames for the windows 14 above the vehicle belt line. Referring in FIGS. 2 and 3, it will be noted that the lower edge of the roof 12 is provided with a substatnially horizontally extending flange 15 to which a substantially channel shaped member 16 is welded. The outer upwardly extending leg 17 of the channel shaped member 16 forms, in cooperation with the lower portion of the roof 12, a water gutter. The inner upwardly extending leg 18 of the member 16 is spotwelded to a roof rail 19, thus providing support for the roof 12.

The roof rail 19 is formed of an outer channel shaped member 21 and an inner member 22 closing the open side of the channel. It is to the outer face of the substantially horizontal (at this point) leg 23 of the roof rail 19 to which the seal or weatherstrip device, generally designated 24, is attached. The seal or weatherstrip is preferably cemented to the roof rail. It will be readily understood that mechanical fastening devices may be used, if desired.

Referring now to FIG. 4, the seal or weatherstrip device 24 comprises an assembly of an elongated substantially hollow sealing member 25 and a relatively non-resilient inverted L-shaped metal strip 26 positioned therein. The sealing member 25 is preferably formed or molded of rubber or simliar resilient material. The member 25 is substantially a hollow piece having a first side forming a base portion 27 adapted to fit flatly against the underside of the roof rail 19. A second side or leg portion 28 depends from the outer longitudinal edge of the base portion 27. In FIG. 4, the member 25 is shown in solid outline in its "free" position, that is, prior to insertion of the metal member 26. It will be noted that in this "free" position the longitudinal axis of the depending leg portion 28 is substantially normal to the plane of the base portion. In the "installed" position, shown in dot and dash outline, the leg portion is flexed outwardly slightly so that its longitudinal axis forms a slightly obtuse angle with the plane of the base.

The third side 29 of the sealing member 25 has a substantially convexly curved appearance from the outside. The curvature is from the depending leg portion 28 toward the inner or right side of the member 25 as it appears in FIGS. 2 to 4, inclusive. The projected area of this curved side 29 substantially overlies the area of the base portion 27.

The fourth side of the sealing member 25 is substantially open. It is defined by opposed lip portions 31 and 32 projecting toward each other from inner longitudinal edges of the base portion 27 and the curved side 29, respectively. The lip portions 31 and 32 have a function to be shortly explained.

It will be noted that the depending leg portion 28 is provided with a short outwardly angularly extending appendage or lip portion 33, for a purpose also to become apparent.

It was earlier stated the seal or weatherstrip device 24 comprises an assembly of the sealing member 25 and the non-resilient inverted L-shaped member 26. The L-shaped member comprises a base portion 34 adapted to lay along the inner side of the seal member base portion 27. The leg portion 35 of the L-shaped member depends at a right angle to the base portion 34 and comprises a double thickness of metal to provide structural strength. It is of a length slightly longer than the "free" width of the resilient sealing member 25 and when inserted therein, as shown in FIGS. 2 and 3, opens up the sealing member 25 to its "installed" width, the relatively "free" and "installed" widths being shown in FIG. 4 in solid and dot and dash outline respectively.

In its illustrated embodiment the seal or weatherstrip 24 is shown (see FIG. 2) in cooperative relationship with the top edge of the window 14, the latter being provided with a conventional metal molding 36 retained and cushioned in the window glass by means of a suitable rubber gasket 37.

FIG. 3 illustrates the appearance of the seal or weatherstrip device 24 when the molding 36 on the window 14 is not in contact with it, either by reason of the window being down or the vehicle door being open. In the event that the vehicle door is closed but with the window down, and the window is subsequently raised, the inner upper edge of the window molding 36 will abut the curved side 29 of the seal or weatherstrip device 24 substantially near its center. As the raising movement is continued the curved side will be deflected inwardly until the condition shown in FIG. 2 is obtained. As shown therein, the portion of the curved side 29 of the resilient member 25 directly in contact with the edge of the molding 36 substantially assumes the contour of the molding. The appendage or lip 33 is pulled inwardly so as to partially shield the outer face of the molding 36. The appendage or lip 33 extends a sufficient distance below the upper edge of the molding 36 to make it extremely unlikely any water could work its way back up and then between the seal and molding. The curved side 29 of the resilient member 25 in addition to being deflected inwardly is placed under tension. The lip 32 engages the lower edge of the leg 35 of the inverted L-shaped member 26. This effectively anchors the free end of the curved side 29 causing said side to be stretched as it is deflected inwardly. The stretching or tensioning action thus occurring increases the pressure and sealing action between the seal or weatherstrip 24 and the molding 36.

Should the window be up but the door open, closing movement of the door also brings the seal or weatherstrip into play. In this case the top surface of the molding 36 lightly touches or may slightly clear the bottom surface of the appendage or lip 33 on the resilient member 25. The inner side of the molding 36 will press against the curved side 29 of the resilient member 25 urging it inwardly. The end result is the same as that previously obtained (see FIG. 2).

Although the embodiment of the invention herein described hass been exemplified as being applied to a door and door frame structure, it will be readily understood that the principle of the invention may be applied to other body openings and closure structures associated therewith, such as the luggage compartment and luggage compartment door.

The seal or weatherstrip embodying the present invention reduces the closing pressure required to close the closure structure and also accommodates greater deviations from the designed conditions between the doors and the luggage compartment door and their respective openings in the body.

It will be understood that the invention is not to be limited to the exact construction shown and described, but that various changes and modifications may be made without departing from the spirit and scope of the invention, as defined in the appended claims.

What is claimed is:

1. A weatherstrip attachable to a vehicle body rail section defining an edge of a body opening receiving a closure structure, said weatherstrip comprising a multi-sided resilient hollow member having a first side engaging said rail section, a curved second side opposite said first side and another side having a longitudinally extending opening therein, and a separate non-resilient member bridging the open side and effective to maintain the longitudinal edges thereof in predetermined spaced relationship upon inward flexure of said curved second side substantially in the direction of said first side by an edge of said closure structure thereby to provide a weather seal, said hollow member retaining its hollow characteristic with said bridging member in position.

2. A weatherstrip attachable to a vehicle body rail section defining an edge of a body opening receiving a closure structure, said weatherstrip comprising a multi-sided resilient hollow member having a first side engaging said rail section, a curved second side opposite said first side and another side having a longitudinally extending opening therein, and a non-resilient member bridging the open side, the edges of said opening being provided with lip portions retaining said non-resilient member against lateral displacement, said non-resilient mmber being effective to maintain said opening edges in predetermined spaced relationship upon inward flexure of said curved second side substantially in the direction of said first side by an edge of said closure structure thereby to provide a weather seal, said hollow member retaining its hollow characteristic with said bridging member in position.

3. A weatherstrip attachable to a vehicle body rail section defining an edge of a body opening receiving a closure structure, said weatherstrip comprising a multi-sided resilient hollow member having a first side engaging said rail section, a normally convexly curved second side opposite said first side and another side having a longitudinally extending opening therein, and a non-resilient member bridging the open side and effective to maintain the longitudinal edges thereof in predetermined spaced relationship upon inward flexure of said curved second side substantially in the direction of said first side by an edge of said closure structure thereby to provide a weather seal, said hollow member retaining its hollow characteristic with said bridging member in position.

4. A weatherstrip attachable to a vehicle body rail defining an edge of a body opening receiving a closure structure, said weatherstrip comprising an elongated hollow resilient member having a base portion, said base portion having an exterior surface adapted to be secured to said body rail, said member having a leg portion extending angularly from said base portion along one longitudinal edge thereof and a curved portion extending from said leg portion in spaced relation to said base portion, the free edge of said curved portion being substantially in spaced opposed relation to the other longitudinal edge of said base portion to provide an opening therebetween, and a separate non-resilient L-shaped member having one leg thereof interposed across said opening between said curved portion and base portion, said hollow member retaining its hollow characteristic with said L-shaped member in position, said one leg of said L-shaped member maintaining said free edge in predetermined spaced relation to the other longitudinal edge of said base portion upon flexure of said curved portion inwardly towards said one longitudinal edge by an edge of said closure structure thereby to provide a weather seal.

5. A weatherstrip attachable to a vehicle body rail section defining an edge of a body opening receiving a closure structure, said weatherstrip comprising an elongated resilient member having a base portion, a leg portion extending at an angle substantially normal to the base portion along one longitudinal edge thereof and a curved portion extending from said leg portion, the projected area of said curved portion substantially overlying the area of said base portion, the free edge of said curved portion in spaced alignment with the other longitudinal edge of said base portion providing an opening therebetween, and non-resilient, separate spacer means bridging the opening between said base portion and curved portion near the longitudinal edges thereof to maintain said free edge in predetermined spaced relationship to said other longitudinal edge of said base portion upon flexure of said curved portion inwardly toward said one longitudinal edge by an edge of said closure structure thereby to provide a weather seal.

6. A weatherstrip attachable to a vehicle body rail section defining an edge of a body opening receiving a closure structure, said weatherstrip comprising an elongated resilient hollow member having a base portion, a leg portion extending angularly from said base portion along one longitudinal edge thereof and a curved portion extending from said leg portion in spaced relation to said base portion, the free edge of said curved portion being substantially in spaced opposed relation to the other longitudinal edge of said base portion providing an opening therebetween, said leg portion being provided with a short appendage extending in a direction opposite to the direction of curvature of said curved portion, and non-resilient means bridging said opening between said curved portion and base portion to maintain said free edge in predetermined spaced relation to said other longitudinal edge of said base portion upon flexure of said curved portion inwardly by an edge of said closure structure thereby to provide a weather seal, said hollow member retaining its hollow characteristic with said bridging means in position, said appendage upon flexure of said curved portion being deflected toward said closure structure edge to provide a shield thereover.

References Cited in the file of this patent

UNITED STATES PATENTS

| | | |
|---|---|---|
| 466,577 | Schrader | Jan. 5, 1892 |
| 1,712,472 | Campbell | May 7, 1929 |
| 2,099,597 | Carr | Nov. 16, 1937 |
| 2,737,412 | Smith et al. | Mar. 6, 1956 |
| 2,746,103 | Bright | May 22, 1956 |
| 2,778,070 | Royer | Jan. 22, 1957 |
| 2,817,558 | Kubacka et al. | Dec. 24, 1957 |

FOREIGN PATENTS

| | | |
|---|---|---|
| 220,759 | Great Britain | Aug. 28, 1924 |